Feb. 7, 1939.   S. I. MacDUFF   2,146,378
RECORDING INSTRUMENT
Filed Jan. 6, 1936   3 Sheets-Sheet 1
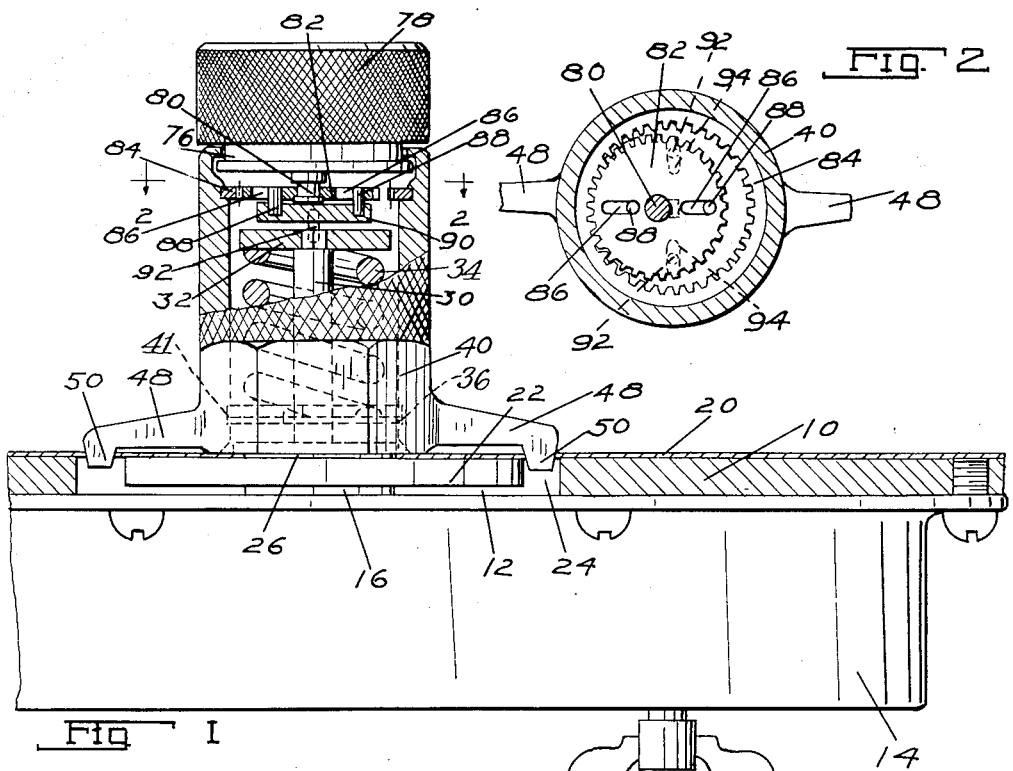
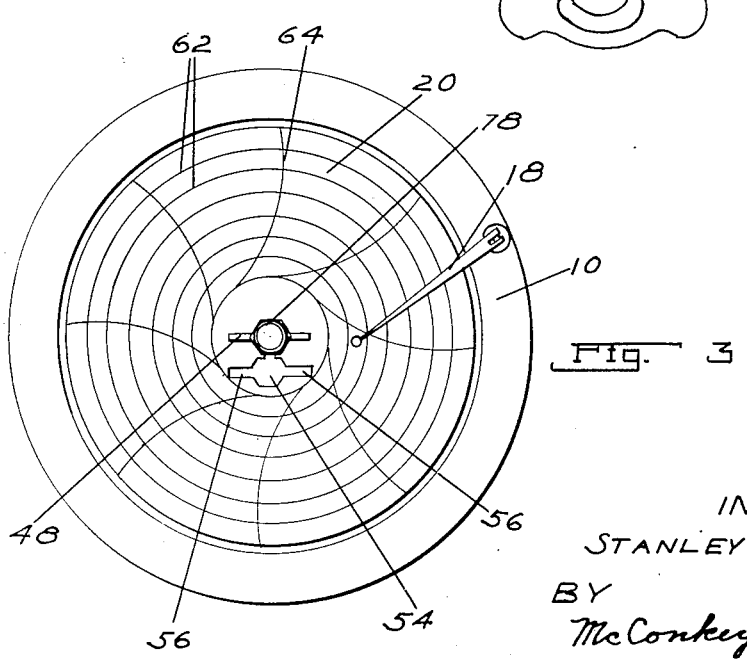
INVENTOR
STANLEY I. MacDUFF
BY
McConkey & Booth
ATTORNEYS.

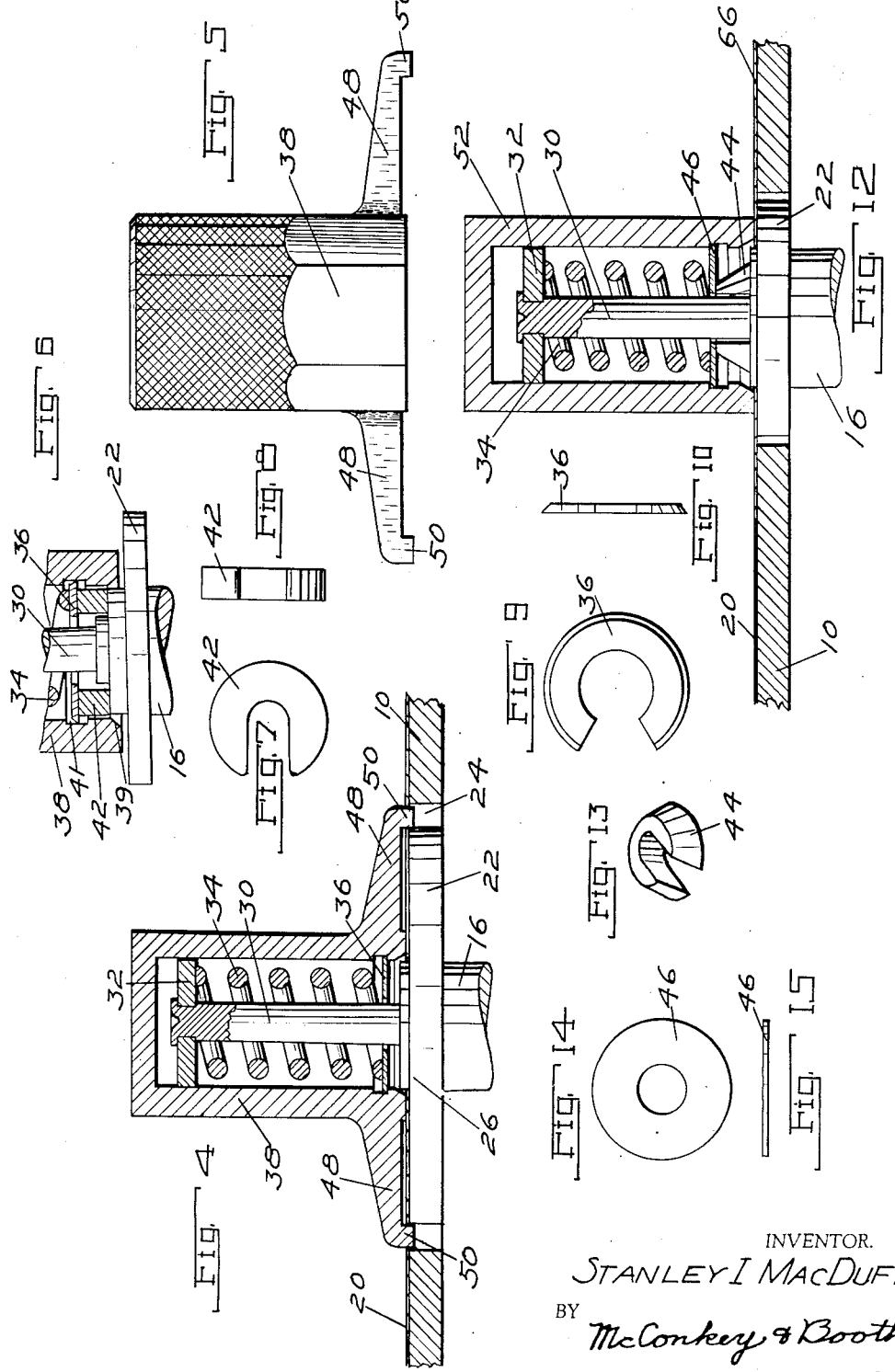

Feb. 7, 1939. S. I. MacDUFF 2,146,378
RECORDING INSTRUMENT
Filed Jan. 6, 1936 3 Sheets-Sheet 3

INVENTOR
STANLEY I. MacDUFF
BY
McConkey & Booth
ATTORNEYS.

Patented Feb. 7, 1939

2,146,378

UNITED STATES PATENT OFFICE 2,146,378

RECORDING INSTRUMENT

Stanley I. MacDuff, Chicago, Ill., assignor, by mesne assignments, to Republic Flow Meters Company, Chicago, Ill., a corporation of Illinois Application January 6, 1936, Serial No. 57,676

7 Claims. (Cl. 234—75)

This invention relates to instruments of the type which makes a record on removable charts, usually circular disks of paper, and is illustrated as embodied in a recording instrument having a pen which makes a permanent record on a chart driven by a clockwork mechanism.

An object of the invention is to facilitate the insertion and removal of the charts, by forming them to be inserted over chart-securing means preferably forming a permanent part of the instrument, and which cannot therefore be dropped or mislaid. The chart is formed in a novel manner to be easily centered and adjusted after being so inserted, and to be readily clamped in place when so centered, without any possibility of disturbing the adjustment.

The above and other objects and features of the invention, including various novel combinations of parts and desirable particular constructions, will be apparent from the following description of the illustrative embodiments shown in the accompanying drawings, in which:

Figure 1 is a section through the chart holding part of an instrument having the above-described cap in two parts connected by reduction gearing;

Figure 2 is a section on the line 2—2 of Figure 1, showing the gearing;

Figure 3 is a front elevation of the parts shown in Figure 1;

Figure 4 is a partial section, corresponding to Figure 1, through another embodiment in which the cap is in one piece and there is no reduction gearing;

Figure 5 is a side elevation of the cap of the embodiment of Figure 4;

Figure 6 is a partial section illustrating the assembly of the cap;

Figures 7 and 8 are plan and elevational views of an anvil used in assembling the cap;

Figures 9 and 10 are plan and elevational views of a spring-retaining washer used inside the cap;

Figure 12 is a section corresponding to Figure 4, but showing an embodiment in which the cap does not have the driving projections for turning the chart;

Figure 13 is a perspective view of the anvil used in assembling the instrument of Figure 12;

Figures 14 and 15 are plan and elevational views of the spring-retaining washer used in the instrument of Figure 12.

Figure 16:
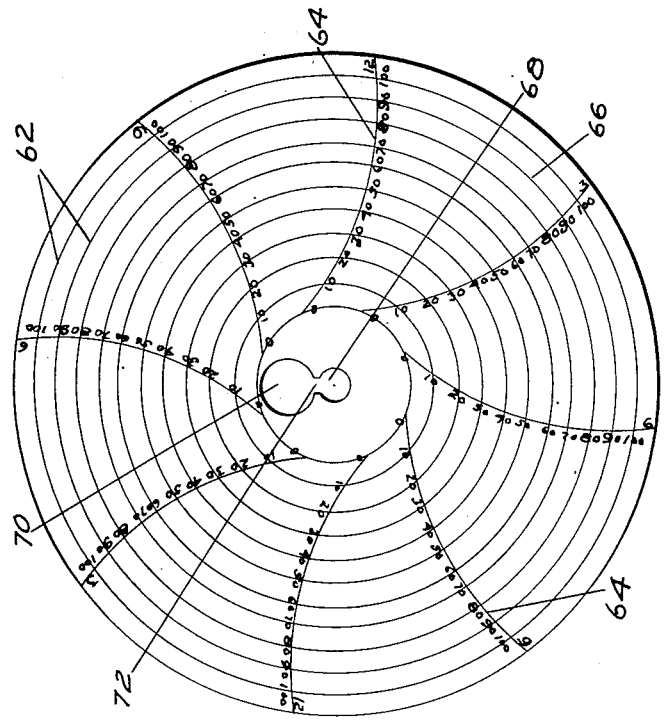
Figure 16 is a plan view of a chart used with the instrument of Figure 12.

The novel instrument of Figures 1-3 includes a suitable panel 10, of any desired character, formed with a central opening 12, behind which is mounted a suitable clock mechanism 14 driving a centering and driving post 16 extending centrally through the opening 12. The instrument has suitable recording means, such as an automatically controlled pen 18, for forming a permanent record on a chart 20 supported as described below on the face of the panel, and which chart is driven by the post 16.

Figure 11:
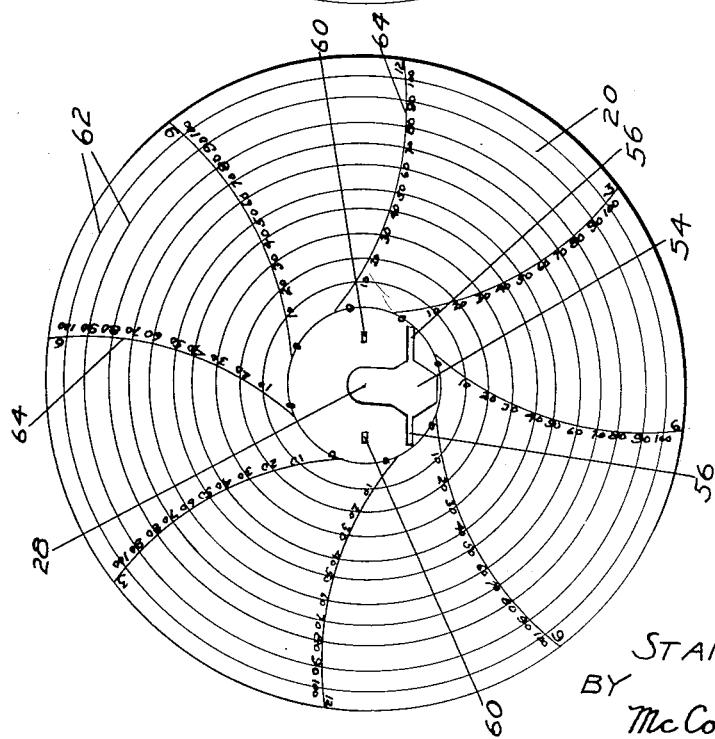
Figure 11 is a plan view of a chart formed for use in either of the instruments of Figure 1 or Figure 4.

The driving post 16 is shown formed with a chart-supporting circular flange 22 having its outer face in the plane of the outer face of the panel 10, and which is somewhat smaller in diameter than the opening 12, leaving an annular space 24 between the flange and the panel. The post extends beyond the flange 22 as a cylindrical section 26, on which a central opening 28 (Figure 11) in the chart is centered as described below, and then as an integral central extension 30 the end of which is peened to secure thereto an abutment or washer 32.

A coil spring 34 is arranged coaxially of the extension 30, and is held compressed between the abutment 32 and a washer 36 (Figure 4) seated against a shoulder in the base of a one-piece cap 38 (Figures 4 and 5) or the lower cylindrical part 40 of a two-piece cap (Figure 1).

As illustrated in Figures 6 to 9, the spring-retaining washer 36 is preferably made of thin spring steel and is of the split type. Its outer periphery is formed frustro-conically to cooperate with a chamfered surface 39 on the cap 38 (or 40). In assembling the cap a C-shaped anvil 42 (Figures 7-8) is placed around the pin 30, then washer 36 and spring 34 are placed on top of it and the spring 34 is next compressed upon these members and the abutment 32 peened in place. Cap 38 (or 40) is next dropped over these assembled parts until chamfer 39 engages the conical surface of the washer 36. A smart hammer blow on the cap 38 (or 40) springs the washer radially inward and drives the cap into position. The washer spreads into slot 41 and is permanently held there by engagement with the sharp edge of the slot. The cap 38 (or 40) is pulled up against the spring 34 and the anvil 42 is then removed.

If preferred, the removable conical C-shaped anvil 44 of Figures 13 and 12 may be used, and in place of the split washer 36, I may use a plain washer 46. The conical anvil engages washer 46 close to its inner opening and cap 38 (or 40) engages its periphery. After assembly as explained above relative to Figures 6 to 9, a sharp hammer blow springs the washer 46 conically downward permitting the cap 38 (or 40) to slip into place after which the washer springs back into the slot 41.

The caps 38 and 40 are formed with side wings 48 having drive projections 50 equally spaced on opposite sides of the axis of the post 16—26—30 and registering with the annular space 24. The cap 52 of Figure 12 does not have these side wings, but is otherwise the same as the cap 38.

The chart 20 used with the instruments of Figures 1 and 4, as previously explained, has a central opening 28, at least a considerable part of the edge of which (e. g. half) is formed on the arc of a circle struck about a center of rotation with respect to which the indicia on the chart is centered, and which is adapted to be centered on the part 26.

The chart also has a larger opening 54, communicating with the opening 28, and shown laterally offset therefrom, and which is of such size and shape as to slip readily over the cap 38 (or 40) and which is shown formed with side slots or extensions 56 long enough to slip readily over the wings 48.

When so placed in the instrument, with the cap 38 or 40 held away from the panel 10, with its spring 34 compressed, the chart can be shifted parallel to its own plane to center the opening 28 with the part 26, and to engage with the projections 50 two drive slots or openings 60. The slots 60 are equally spaced on opposite sides of the center of the circle upon which opening 28 is in part formed, along a diameter of the circle perpendicular to the diameter joining the centers of the openings 26 and 54.

With the chart so arranged, it will be seen that it is accurately centered by engagement of the slots 60 with the projections 50, and by engagement of the circular upper half of the opening 28 (Figure 11) with the surface of the part 26. The cap 38 (or 40) may now be turned to adjust the chart angularly, whereupon the cap 38 (or 40) is released and yieldingly clamps the chart against the flange 22 to be driven by the mechanism 14 or its equivalent.

The indicia illustrated on the chart includes a series of concentric circles 62 shown graduated from 0 to 100, and which facilitate reading the angular position of the pen 18 when it has made its record, and a series of circular curves 64 struck about the axis of the pen arm and which indicate the time of day.

The chart 66 of Figure 16, used with the instrument of Figure 12, has a central small circular opening 68 adapted to fit over the part 26 and a larger opening 70 adapted to slip over the cap 52, connected by a passage 72 the width of which is slightly greater than the diameter of the extension 30.

The upper end of the cap 40 is peened over, rotatably to seat in a groove 76 in the bottom of an upper cap part 78, which is thus rotatable relatively to part 40. The lower face of the cap part 78 carries an eccentric drive pin 80 on which is centrally journaled a stamped gear or pinion 82 having external teeth meshing with internal teeth formed in a stamped ring gear 84 of larger diameter and consequently having a larger number of teeth than pinion 82 and pressed into a seat in the upper end of part 40.

Pinion 82 is shown with diametric slots 86 embracing upwardly-projecting pins 88 carried by a washer 90 which also has, at right angles to the pins 88, downwardly-projecting pins 92 projecting into slots 94 in the abutment washer 32.

Since the post 30 is fixed the washer 90 is prevented from rotating about its own axis by the pins 92 acting against the sides of the slots 94. Similarly the pinion 82 is prevented from rotating about its own axis by engagement of the pins 88 with the sides of slots 86. However, the pinion 82 may move bodily in any direction in its own plane without turning on its axis due to the fact that pins 88 and 92 can slide in slots 86 and 94 respectively. As the cap part 78 is turned it will turn the eccentric 80 and since this is connected to the pinion 82, this pinion will be moved bodily in a circular orbit without rotating about its own axis. With this type of motion the velocity of any point on the pinion 82 can never be more than the velocity of the eccentric pin 80. Therefore, the point at which pinion 82 engages gear 84 is moved with the same velocity as the pin 80 and the gear 84 and cap 40 are rotated with a peripheral velocity equal to that of the pin 80. Thus the gear 84 and cap 40 are rotated by the pin 80 at an angular velocity equal to the angular velocity of pin 80 times the radius of pin 80 over the radius of gear 84.

Thus the parts just described form a simple and inexpensive reduction gearing connecting the two cap parts. Since the cap parts 40 and 78 are permanently but rotatably joined, the composite cap may be lifted off the chart against the resistance of spring 34 by grasping either of them.

When this type of cap is used, part 40 is used to secure quickly an approximate adjustment of the chart, and then part 78 is manipulated to secure an accurate final adjustment thereby to adjust the chart to the proper timed position on the instrument.

While several instruments, and two different charts, have been described in detail, it is not my intention to limit the scope of the invention by that description, or otherwise than by the terms of the appended claims.

I claim:

1. An instrument comprising a panel having a central opening, a post rotatably mounted at the center of said opening and having a chart-supporting part arranged in but slightly smaller than said opening, to leave an annular space, and which has its chart-engaging surface substantially in the plane of the face of the panel and which has a central cylindrical projection on which a chart may be centered, a chart having at its center an opening fitting over and centered on said projection and having other openings spaced from the center of the chart along a line passing through the center of said center opening and which register with said annular space on opposite sides of said projection, and a chart-holding device rotatably carried by said post and having projections extending into said other openings for turning the chart and having means for clamping the chart against said chart-supporting part.

2. An instrument comprising a panel having a central opening, a post rotatably mounted at the center of said opening and having a chart-supporting part arranged in but slightly smaller than said opening, to leave an annular space, and which has its chart-engaging surface substantially in the plane of the face of the panel and which has a central cylindrical projection on which a chart may be centered, a chart having at its center an opening fitting over and centered on said projection and having other openings spaced from the center of the chart along a line passing through the center of said center opening and which register with said annular space on opposite sides of said projection, and a chart-holding device rotatably carried by said post and having projections extending into said other openings for turning the chart and having means for clamping the chart against said chart-supporting part, said chart having at one side of its center an opening large enough and of such a shape as to pass over said chart-holding device and which is connected to said first opening by a passage so arranged that the chart may be inserted in the instrument by passing the large opening over said device and then shifting the chart parallel to its own plane to bring the first opening over and, in centered relationship with, said projection.

3. An instrument comprising a panel having a central opening, a post rotatably mounted at the center of said opening and having a chart-supporting part arranged in but slightly smaller than said opening, to leave an annular space, and which has its chart-engaging surface substantially in the plane of the face of the panel and which has a central cylindrical projection on which a chart may be centered, a chart having at its center an opening fitting over and centered on said projection and having other openings spaced from the center of the chart along a line passing through the center of said center opening and which register with said annular space on opposite sides of said projection, and a chart-holding device rotatably carried by said post and having projections extending into said other openings for turning the chart and having means for clamping the chart against said chart-supporting part, and said device having a spring arranged yieldingly to hold the chart clamped against said chart-supporting part and being arranged to be lifted against the resistance of the spring without removing the projections from the said other openings, whereby the chart may be adjusted annularly by rotating said device while so lifted.

4. An instrument having a stationary panel formed with a circular opening, a driving post arranged coaxially of said opening and provided with a part formed with a chart-supporting surface in the plane of the face of the panel and which is of circular outline but smaller than the opening, leaving an annular space between said part and the edge of the opening, said post also carrying projecting beyond the face of the panel a projection substantially coaxial of the post and having an abutment at its end; a cap arranged over the projection and provided with wings having driving projections extending into said annular space, said cap carrying at its base a washer having a central opening loosely encircling said projection, and a coil spring compressed between the abutment and said washer and having said projection arranged at its axis.

5. In an instrument having drive mechanism and a driving post formed with a projection substantially coaxial of the post and having an abutment at its end, the combination of a chart holding device comprising a cap arranged over the projection, said cap carrying at its base a washer having a central opening loosely encircling said projection, and a coil spring compressed between the abutment and said washer and having said projection arranged at its axis, said cap being in two parts drivably connected by reduction-gear means and means on one of said parts for drivably engaging a chart whereby turning of the other of said parts will turn the chart at a reduced rate.

6. In an instrument having drive mechanism and a driving post formed with a projection substantially coaxial of the post and having an abutment at its end, the combination of a chart holding device comprising a cap arranged over the projection, said cap carrying at its base a washer having a central opening loosely encircling said projection, and a coil spring compressed between the abutment and said washer and having said projection arranged at its axis, said cap being in two parts drivably connected by reduction-gear means including an internally-toothed ring gear carried by one of said parts and a pinion having a different number of teeth meshing therewith and held against rotation by said projection, together with an eccentric device operated by the other of said parts and moving said pinion around with a planetary motion about a center offset from the axis of the cap and means on one of said parts for drivably engaging a chart whereby turning of the other of said parts will turn the chart at a reduced rate.

7. In an instrument having drive mechanism and a driving post formed with an abutment, the combination of a chart holding device comprising a cap arranged over the post and rotatable relatively thereto, said cap carrying at its base a washer having a central opening loosely encircling said post, a coil spring compressed between the abutment and said washer, and an extension on the cap adapted to engage a chart at a point remote from the post to turn the chart as the cap is rotated.

STANLEY I. MacDUFF.